United States Patent [19]
Janycky

[11] 3,774,109
[45] Nov. 20, 1973

[54] LOW VOLTAGE INDICATOR
[76] Inventor: Lubomyr Janycky, 2508 Brown Street, Philadelphia, Pa. 19130
[22] Filed: Mar. 20, 1972
[21] Appl. No.: 236,260

Related U.S. Application Data
[63] Continuation-in-part of Ser. No. 881,831, Dec. 3, 1969, abandoned.

[52] U.S. Cl............ 324/103 P, 324/102, 340/248 B
[51] Int. Cl............................................. G01r 19/16
[58] Field of Search................... 324/103 R, 103 P, 324/102; 317/31, 148.5; 340/248 R, 248 B, 253 B

[56] References Cited
UNITED STATES PATENTS
2,001,494  5/1935  Jones..................................... 317/31
3,343,036  9/1967  Steen..................................... 317/31

Primary Examiner—Rudolph V. Rolinec
Assistant Examiner—Ernest F. Karlsen
Attorney—Henry N. Paul Jr. et al.

[57] ABSTRACT

In association with an electric distribution system, apparatus for monitoring and registering for subsequent interrogation an occurrence, sustained for at least a predetermined period, of a voltage condition of the system less than a predetermined voltage, comprising an electric circuit having a temperature compensated threshold voltage sensing subcircuit, an arming, timing and transistor-controlled lock-out subcircuit, and an interrogable readout subcircuit. In alternate embodiments, the holding current of a silicon controlled rectifier is used to accomplish lockout, and a non-interruptable power supply subcircuit is added for retention of the voltage-monitoring state during zero voltage conditions due to power outages.

22 Claims, 4 Drawing Figures

INVENTOR.
Lubomyr Janycky

BY

*Paul + Paul*

ATTORNEYS.

LOW VOLTAGE INDICATOR

CROSS-REFERENCE TO RELATED APPLICATION

This is a Continuation-In-Part of applicant's prior application Ser. No. 881,831, filed Dec. 3, 1969, now abandoned, having the same title.

BACKGROUND OF THE INVENTION

A. Field of the Invention

This invention relates to undervoltage sensing and indicating devices, and particularly to solid state circuits for monitoring low voltage conditions on distribution lines supplying electric utilization devices.

B. Description of the Prior Art

In order to prevent damage to electric utilization equipment, electric utilities are required to maintain voltages within a range specified by the public utility commission. There is seldom any high-voltage problem, but the expanding development of the secondary distribution system load and particularly the rapid increase in use of air conditioners sometimes results in occurrences of abnormally low voltage before adjustments can be made. Although low voltages are ordinarily unnoticeable to the customer, the proliferation of television broadcast receivers in which low voltage causes shrinkage or collapse of the display, has resulted in a greatly increased number of low voltage complaints.

When a primary utility customer's voltage decreases to an unacceptable level, or following a large customer's low voltage complaint, it is customary for the utility to install instrumentation to record, verify and assess the magnitude of the problem and to take proper corrective measures. This procedure, however, is not feasible when dealing with the low voltage problem affecting the utility's residential customers. The vast number of customers, numbering in hundreds of thousands, lack of ease of access to residential customer owned in-house wiring, lack of installation space and scarcity of utility personnel, preclude the usual low voltage monitoring procedure applied to large power company customers. Since the only item usually wholly owned by a utility on a residential customer's premises is the watthour meter, it would be desirable to have the residential customer's low voltage monitoring and registering device incorporated within the watthour meter housing.

SUMMARY OF THE INVENTION

The primary object of my invention is to provide a reliable low voltage indicator (LVI) for monitoring an electric circuit for occurrence of a voltage thereon which is below a predetermined voltage level.

Further objects of this invention are to provide a low voltage indicator (LVI):

a. whose operational power is derived from the electric circuit being monitored, without appreciably affecting the voltage level of such circuit;

b. which may be installed in a very small space, such as the space available in the casings of existing types of residential watthour meters;

c. accurately responsive to occurrence of a voltage level below a predetermined threshold voltage, over a relatively wide range of ambient temperatures;

d. having a power consumption in the milliwatt range;

e. incorporating a time delay feature for inhibiting registration of low voltage conditions which exist for less than a predetermined time;

f. having a memory subcircuit which, upon occurrence of a sustained low voltage condition and subsequent recovery of monitored voltage to nominal level, will lock-out and retain indication of the occurrence of the low voltage condition until the subcircuit is re-armed;

g. having a non-interruptable power supply subcircuit to maintain it in an un-locked state upon total loss of monitored voltage and to eliminate the subsequent need of resetting following the restoration of power to the line being monitored;

h. containing simple magnetic means for conveniently rearming the circuit;

i. capable of remote operations of interrogation for occurrence of a low voltage condition which was sustained for at least a predetermined interval, readout, rearming and acknowledgement;

j. accessory for a conventional residential watthour meter compact enough to be installed inconspicuously in the watthour meter casing; and k. assembled from commercially available inexpensive components and adapted for mass production.

Accordingly, this invention provides a solid state low voltage indicator circuit which comprises three interconnected subcircuits energized from the circuit being monitored, as follows:

a. A voltage sensing temperature-compensated zener diode switching subcircuit maintained in conducting mode when the voltage being monitored exceeds a predetermined threshold voltage and in nonconducting mode when the voltage is below the threshold voltage.

b. A transistorized RC network time-delay subcircuit connected in series with the switching subcircuit (a), which may be armed when the switching subcircuit (a) is in conducting mode, for sealing in and maintaining the timing capacitor in normal charged condition, ready for timing out. If the subcircuit (a) is thereafter switched to the non-conducting mode, the timing network will begin timing out. Should the subcircuit (a) be switched back to its conducting mode before completion of the predetermined timing interval, the timing capacitor will be recharged to its ready condition. When the low voltage persists for an interval longer than the timing interval, lockout is effected to prevent subsequent charging of the timing capacitor until subcircuit (b) is rearmed. The time-delay subcircuit may include means to prevent timing out when the monitored voltage drops to zero.

c. A readout subcircuit having a display signal in series with a momentary switch and a controlled rectifier whose gate bias voltage is supplied from subcircuit (b). When the timing capacitor of subcircuit (b) is in its normally charged condition corresponding to the monitored voltage not having been below the threshold voltage for at least the timing interval, the gate bias voltage supplied to the controlled rectifier is sufficient to turn it on so that operation of the momentary switch will actuate the signal. After subcircuit (b) has been locked out, the voltage supplied to the gate of the controlled rectifier is insufficient to turn it on and the signal is inoperative.

DESCRIPTION OF THE PREFERRED EMBODIMENTS

Figure 1:
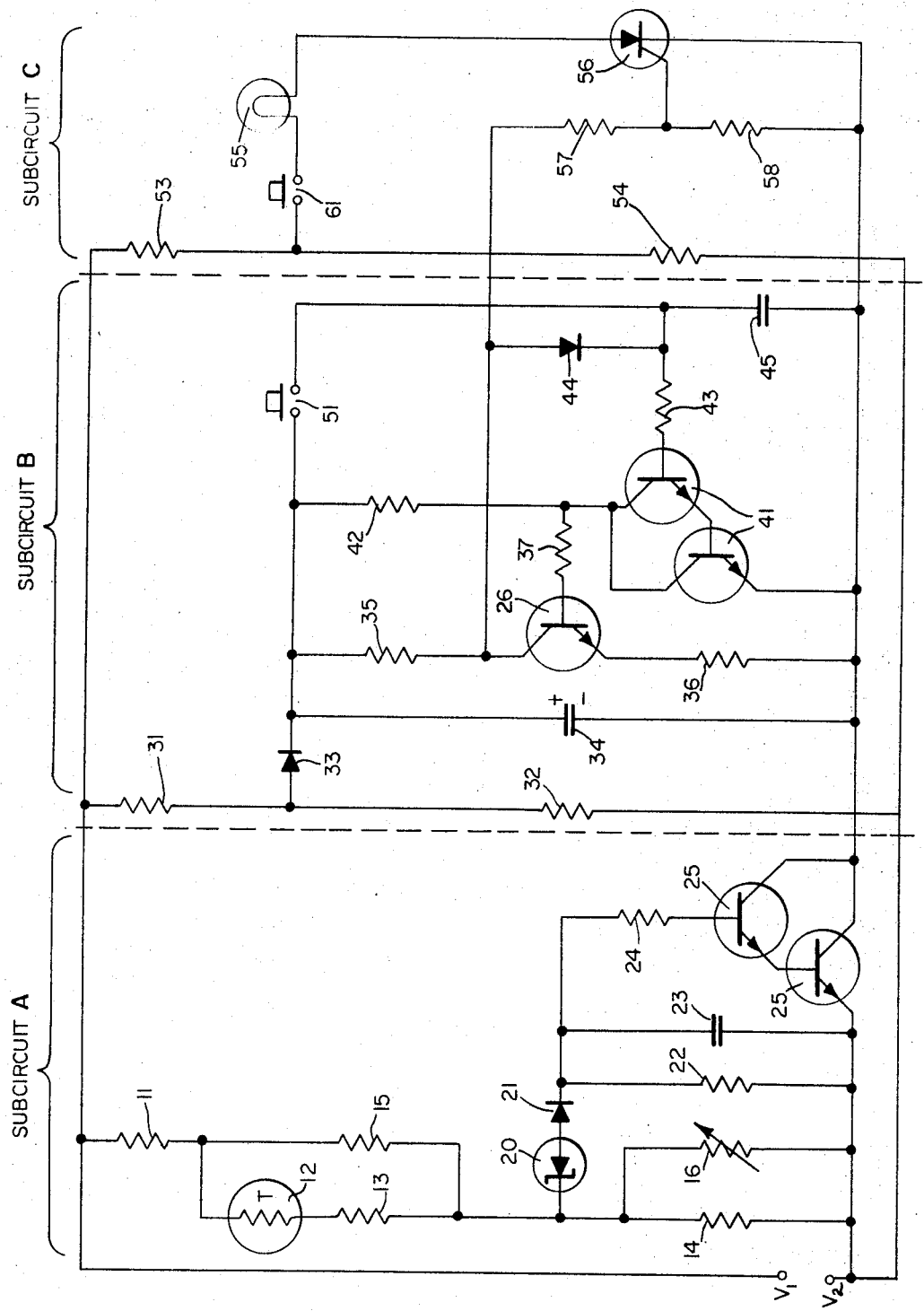
FIG. 1 is a schematic diagram of a preferred form of the LVI circuit.

Referring now to the drawings, FIG. 1 shows an LVI circuit comprised of three interconnected subcircuits, as follows:

1. A voltage sensing temperature-compensated zener diode switching subcircuit A.
2. A timing and lockout subcircuit B.
3. A readout subcircuit C.

Each of these subcircuits is energized from the voltage to be monitored and although a common voltage divider may be used, it is preferred to use respective individual resistive voltage dividers. The advantage of using separate voltage dividers is to minimize heat dissipation and self-heating effects on the temperature-compensating circuitry of subcircuit A.

THE VOLTAGE SENSING TEMPERATURE-COMPENSATED ZENER DIODE SWITCHING SUBCIRCUIT A.

The voltage divider of subcircuit A is connected across the terminals $V_1$, $V_2$ of the voltage source being monitored and comprises in series from the terminal $V_1$, a resistor 11, a thermistor 12, a resistor 13 and a resistor 14. A resistor 15 is connected in parallel with the series combination of the thermistor 12 and the resistor 13, and a trimming variable resistor 16 is connected across the resistor 14. A zener diode 20 has its cathode connected between the resistors 13 and 14, and its anode connected to the anode of a rectifier diode 21. Connected in parallel between the cathode of the diode 21 and the side $V_2$ of the source is a resistor 22, a capacitor 23 and a resistor 24 in series with a Darlington switching transistor 25. The collector of the transistor 25 is connected to the negative side of the timing and lockout subcircuit B.

The zener 20 is selected for the desired threshold low voltage cut-off point. The current passed by the zener 20 is half-wave rectified by the diode 21, filtered and stored on the capacitor 23, stabilized by the resistor 22 and then applied through the resistor 24 to the base of the transistor 25 which controls the power supply to the sub-circuit B. Under normal voltage conditions, the current into the base of transistor 25 switches it on, effectively tying the $V_2$ side of the source to the negative side of subcircuit B. For a monitored voltage of less than the threshold voltage, no current is passed by the zener diode-rectifier diode combination, and the stored charge on capacitor 23 discharges quickly through transistor 25, whereupon it is switched off. The thermistor 12 provides temperature compensation for the zener 20 so that it maintains an accurate threshold voltage throughout the contemplated range of operating ambient temperatures.

THE TIMING AND LOCKOUT SUBCIRCUIT B

The power supply for the timing and lockout subcircuit B comprises a voltage divider consisting of resistors 31 and 32 connected across the source $V_1$, $V_2$, a half-wave current rectifier diode 33 having its anode connected between the resistors 31 and 32 and a capacitor 34 connected between the cathode of the diode 33 and the collector of the switching transistor 25 of subcircuit A.

A transistor 26 is connected across the capacitor 34 from positive to negative through a collector resistor 35 and an emitter resistor 36. The base of the transistor 26 is connected through a base resistor 37 to the collector of a Darlington transistor 41 whose collector is also connected through a resistor 42 to the positive side of the capacitor 34 and its emitter is connected to the negative side of the capacitor 34. The base of the transistor 41 is connected through a base resistor 43 to the cathode of a rectifier diode 44 which has its anode connected to the collector of the transistor 26. A timing capacitor 45 is connected between the cathode of the diode 44 and the negative side of the capacitor 34. A normally-open momentary contact arming switch 51 is connected between the cathodes of the diodes 33 and 44.

Resistors 35 and 42 are of resistive value approximately 15 times greater than the resistor 36. Resistor 43 is of very high resistance and together with capacitor 45 comprises an RC timing network. Diode 44 performs a blocking function during the timing out discharge function of capacitor 45.

Starting with an initial condition in which the timing transistor 41 is turned off, switching on of the transistor 25 energizes the power supply of subcircuit B and turns on lockout transistor 26. The bias on the base of the transistor 41 is obtained substantially from the voltage drop across the resistor 36, the drop across transistor 26 being negligible. The resistive value of resistor 36 is so selected that its voltage drop is insufficient to cause turn on, so that transistor 41 will remain turned off. However, when switch 51 is momentarily operated to arm the subcircuit, the transistor 41 will be turned on because the entire voltage of the capacitor 34 will appear across the capacitor 45 and the base of the transistor 41. When the transistor 41 is turned on, the base of the transistor 26 is effectively connected to its emitter, thus reducing to zero the bias on the base of the transistor 26 and turning it off, with the resistor 42 limiting the current through the transistor 41. The subcircuit is now in armed condition with the voltage across the timing capacitor 45 being supplied from the capacitor 34 through the resistor 35 and diode 44.

When the voltage being monitored falls below the threshold value, transistor 25 will be switched off, deenergizing the power supply to subcircuit B. The capacitor 34 discharges immediately through the transistor 41 but the capacitor 45 can discharge only through the high resistance 43, the time constant of the RC network of resistor 43 and capacitor 45 being so selected as to keep the transistor 41 turned on for the desired timing out interval. When the RC network has timed out, the transistor 41 will be turned off and remain so until the subcircuit is rearmed.

THE READOUT SUBCIRCUIT C

The voltage divider supplying voltage to the readout subcircuit C comprises resistors 53 and 54 connected across the voltage source $V_1$, $V_2$. Connected between these resistors is a normally-open momentary contact interrogating switch 61 in series with a neon glow lamp 55 connecting to the anode of a controlled rectifier 56 whose cathode is connected to the negative side of the capacitor 34. The gate of the rectifier 56 is connected at the junction of a resistor 57 connected to the collector of transistor 26 and a resistor 58 connected to the cathode of the rectifier 56.

When the voltage being monitored is above the low voltage threshold and subcircuit B is energized and armed, a substantial proportion of the voltage across the capacitor 34, equal to the drop across the resistor 58, will be applied to the gate of the controlled rectifier 56 and turn it on. Under these circumstances, closing of the switch 61 will energize the glow lamp 55 for as long as the switch is held closed. However, should the timing circuit have timed out and turned off the transistor 41, the voltage across resistors 57 and 58 can then be only the voltage across the resistor 36, which provides a voltage across the resistor 58 insufficient to turn on the rectifier 56 for energizing the lamp 55.

Accordingly, glowing of the lamp 55 upon actuation of the switch 61 assures that the voltage of the monitored source $V_1$, $V_2$ could not have been continuously sustained below the predetermined threshold voltage for an interval longer than the timing out period. Conversely, inability to energize the lamp 55 by actuating the switch 61 indicates that there was at least one occurrence of sustained voltage below the threshold for at least the timing out period.

Should previous existence of low voltage be indicated by a finding upon interrogation that the lamp 55 does not light, a check on the integrity of the LVI circuit can be readily made by again interrogating after the subcircuit B has been rearmed. Lighting of the lamp 55 will then indicate that the LVI circuit is operative.

Low voltage indicators in accordance with the circuit of FIG. 1 are in successful use by the Philadelphia Electric Company as a residential watthour meter accessory for monitoring the service voltage. For this use, the LVI circuit was required to be inexpensive and small, and compact enough to be installed inconspicuously within the watthour meter casing. All components are inexpensive and off-the-shelf commercially available. The voltage dividers are arranged for applying low voltages on the capacitors to minimize their physical sizes. The variable trimming resistor 16 is used for adjusting the threshold voltage to the desired value and it is then replaced by a much smaller fixed resistor of the same resistive value. Conventional magnetic reed switches are used for the switches 51 and 61 so that the meter reader may interrogate and if necessary rearm the circuit through the glass meter cover with an externally-positioned permanent magnet, at the time he reads the meter. Each of these LVI's has an overall volume of less than 2.3 cubic inches and is mounted inconspicuously behind and below the meter register.

The devices used by Philadelphia Electric Company are for use on nominal 240-volt services and have a low voltage threshold of $220 \pm 2.4$ volts and a timing out period of $4 \pm 1$ minute.

The components of such LVI circuits for use between ambient temperatures of 20° to 140°F may effectively be of the following accuracy classes and wattages.

Resistors 11, 13, 14, 15, and 16 of the temperature compensating circuit should be of low temperature coefficient 2 percent accuracy class, low wattage. All other resistors may be of carbon composition, 10 percent accuracy class, low wattage. The capacitors may be of 20 percent accuracy, with capacitor 23 of the low leakage type and capacitors 34 and 45 of the electrolytic type. The Zener diode is preferred to be of 5 percent accuracy class, ½ watt. The rectifier diodes 21, 33 and 44 may be silicon low leakage, low voltage type. The transistors may be medium voltage, low wattage switching type, Darlington transistors 25 and 41 each having a gain of at least 400, and transistor 26 having a gain of at least 20. The thermistor 12 may have a dissipation constant of 1 milliwatt per degree C, 20 percent accuracy class. The silicon controlled rectifier 56 may be of medium voltage, very low current class. The glow lamp 55 may be a common neon indicator lamp.

DESCRIPTION OF THE MODIFICATION OF FIG. 2

Figure 2:
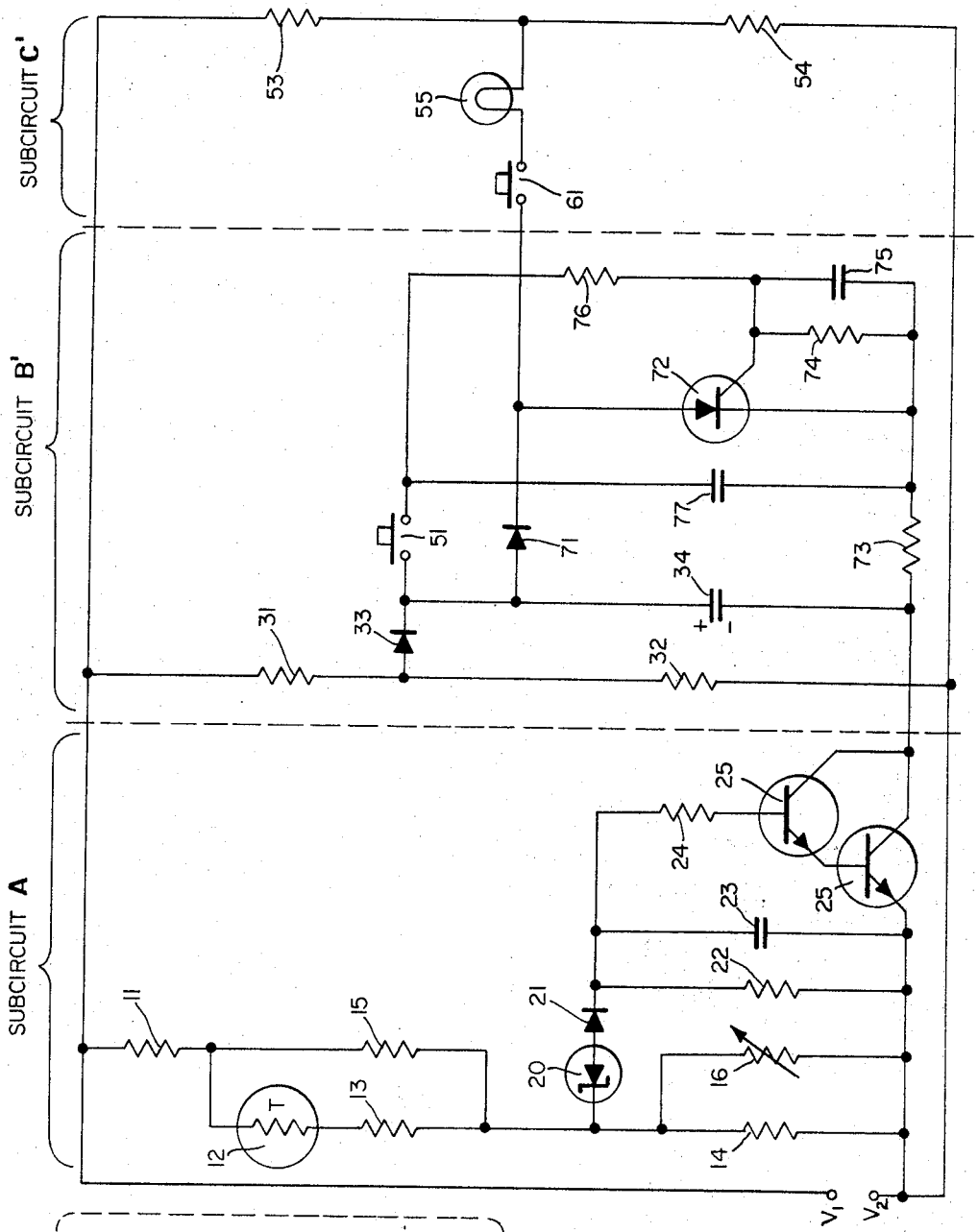
FIG. 2 is a schematic diagram of a modification of the LVI circuit of FIG. 1 wherein the holding current of a silicon controlled rectifier is used to accomplish lockout.

The modification illustrated in FIG. 2 is functionally the same as the LVI circuit of FIG. 1 and similarly has three subcircuits, a voltage sensing subcircuit, a timing and lockout subcircuit and a readout subcircuit. The voltage sensing subcircuit of the LVI circuit of FIG. 2 is identical with subcircuit A of FIG. 1. The timing and lockout subcircuit B' and the readout subcircuit C' of FIG. 2, which are functionally identical with subcircuits B and C of FIG. 1, will now be described.

THE TIMING AND LOCKOUT SUBCIRCUIT B'

The power supply for the subcircuit B' is identical with the power supply for the subcircuit B, comprising the voltage divider resistors 31 and 32, the diode 33 and the capacitor 34 which now also serves as the timing capacitor, and is similarly energized by switching on of the transistor 25. A rectifier diode 71 has its anode connected to the positive side of the timing capacitor 34 and its cathode connected to the anode of a silicon controlled rectifier 72 whose cathode is connected through a timing resistor 73 to the negative side of the timing capacitor 34. A resistor 74 and a transient suppressing capacitor 75 are connected in parallel between the gate and the cathode of the rectifier 72 which has been specially selected for a low value of holding current. The arming normally-open momentary switch 51 in series with a resistor 76 is connected from the cathode of the diode 33 to the gate of the rectifier 72. Another transient suppressing capacitor 77 is connected between the cathode of the rectifier 72 and the junction of the switch 51 and the resistor 76.

Until the arming switch 51 is initially closed, there will be no voltage bias on the gate of the rectifier 72 which will therefore remain in turned-off condition. With transistor 25 switched on, momentary actuation of the switch 51 will cause current to flow through resistors 76 and 74, the voltage drop across the resistor 74 being adequate for biasing the gate to trigger the rectifier 72 into conduction and thus to arm subcircuit B'. Once triggered, the rectifier 72 will maintain conduction. The timing capacitor 34 will have a discharge path through the diode 71 and the timing resistor 73, but its voltage will be maintained through voltage divider 31 and 32. The timing resistor 73, together with the transient suppressing capacitors 75 and 77, are utilized for suppressing spurious transient voltage triggering of the low holding current rectifier 72.

Upon switching off of the transistor 25 as a result of decrease of the monitored voltage below the low voltage threshold, power supply will be cut off from the timing capacitor 34 which will then begin to time out by discharging through the rectifier 72 and the timing resistor 73. Decay of the discharge current of the timing capacitor 34 to the cut-off value of the low holding current rectifier 72 will turn off this rectifier and timing out will be completed. After the RC network has timed out, the rectifier 72 can be triggered into conduction only by again actuating the arming switch 51.

Should the monitored voltage increase to a value above the low voltage threshold before the RC network has completely timed out, the transistor 25 will be switched on to restore power to the timing capacitor 34 and maintain the rectifier 72 in conducting mode. Accordingly, the rectifier 72 will remain conducting for occurrences of monitored voltage continuously below the low voltage threshold for periods less than the timing out period, and will be turned off upon an occurrence of voltage continuously below the threshold for a period at least as long as the timing out period.

THE READOUT SUBCIRCUIT C'

The voltage divider of the subcircuit C' comprises the same resistors 53 and 54 as in the subcircuit C. The neon glow lamp 55 in series with the normally-open momentary contact interrogating switch 61 is connected between the junction of the resistors 53 and 54 and the cathode of the diode 71 of subcircuit B'.

When the voltage being monitored is above the low voltage threshold and subcircuit B' is energized and armed, closing of the switch 61 will permit current from the voltage divider to flow through the lamp 55 and the rectifier 72. After the RC network timer of subcircuit B' has timed out and established the rectifier 72 in non-conducting mode, closing of the switch 61 will no longer energize the lamp 55.

Figure 3:
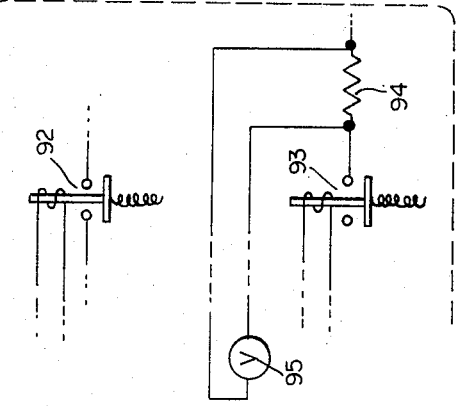
FIG. 3 is a schematic diagram of apparatus for remote readout and control of the devices of FIGS. 1 and 2.
Figure 4:
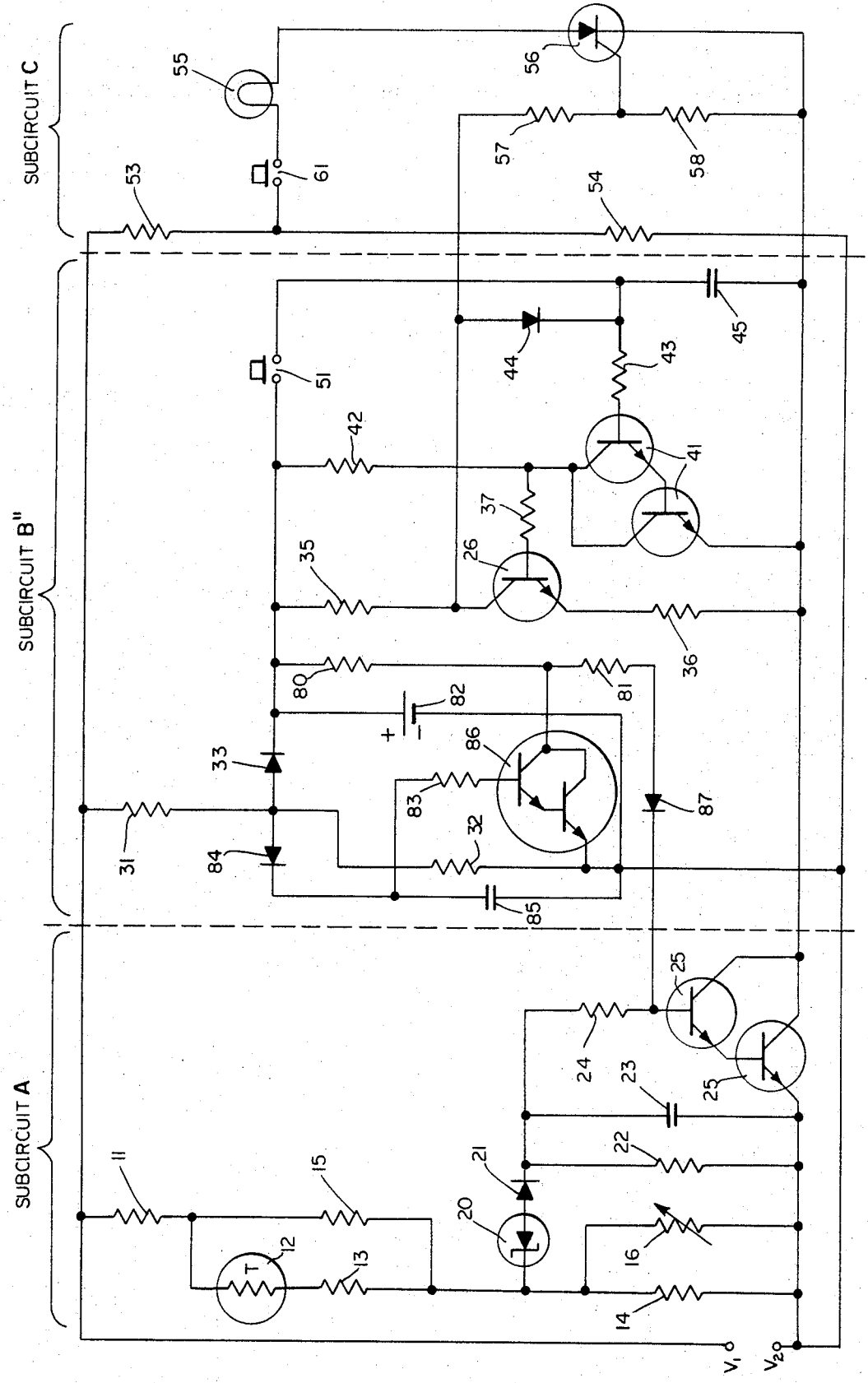
FIG. 4 is a schematic diagram of a modification of the LVI circuit of FIG. 1 wherein the circuit does not time out upon the occurrence of a zero voltage condition.

FIG. 3 represents apparatus for remote readout and rearming of the LVI circuits of FIGS. 1, 2 and 4. Remotely controlled relays 92 and 93 which are spring biased in the open position and may be conventional reed relays, are substituted for the respective switches 51 and 61 of subcircuits C and C' and are connected by wiring to the site of remote operation. A suitable resistor 94 may be substituted for the lamp 55 and read out remotely as by the voltmeter 95, a glow lamp similar to lamp 55, or other registering means.

The switches 92 and 93 may be conventionally controlled from a remote location by a radio link instead of the wiring illustrated. Remote interrogation, readout, rearming and checking for integrity may all be accomplished by a computer and the data stored and processed in conventional manner for suitable remedial action if a low voltage condition had been registered.

DESCRIPTION OF THE MODIFICATION OF FIG. 4

The modification illustrated in FIG. 4 presents the LVI circuit of FIG. 1 modified to include non-interruptable power supply circuitry for retaining the LVI in the voltage-monitoring state during zero voltage conditions, such as are caused by power outages. In this modification, the timing and lockout subcircuit (B'') is modified, as compared to subcircuit B shown in FIG. 1, so that in the event the monitored voltage at terminals $V_1$ and $V_2$ drops to zero, the memory portion of the timing and lockout subcircuit does not lock out so as to indicate low voltage. This is a desirable feature in order to distinguish between low voltage, and the condition where power is out due to some factor unrelated to an occurrence of low voltage.

In subcircuit B'', a diode 84, with its anode in electrical connection with the anode of diode 33, is connected in series with a capacitor 85, the series combination being connected in parallel with resistor 32. Transistor 86 (shown as a Darlington pair) has its emitter terminal connected at the junction of resistor 32 and capacitor 85, and its base is connected through resistor 83 to the junction of diode 84 and capacitor 85. A resistor 80 is connected between the collector of transistor 86 and the cathode of diode 33, and a resistor 81 in series with blocking diode 87 is connected between the collector of transistor 86 and the base of transistor 25 (in subcircuit A). A battery 82, which supplies power to sustain operation of the LVI during power outage, as explained hereinbelow, is connected between the cathode of diode 33 and the emitter of transistor 86.

In operation, when a non-zero voltage is present at the input terminals $V_1$ and $V_2$, the voltage sensing subcircuit A operates as in the above embodiments, providing a closed path through transistor 25 as long as the monitored voltage is above the predetermined sensing voltage, and disconnecting power from the timing and lockout subcircuit when the voltage drops below the predetermined level, such that the timing and lockout circuit times out to indicate a low voltage occurrence. During such normal operation, battery 82 is charged through diode 33, and while maintained at full charge acts as a very large filter capacitor, effectively replacing capacitor 34 (as used in subcircuit B). Thus, timing capacitor 45 is normally maintained in the charged condition, since battery 82 is connected thereacross through resistor 35, diode 44 and transistor 25. At the same time, capacitor 85 charges through diode 84, developing a voltage at the base of transistor 86 with respect to its emitter, which turns on transistor 86. It is noted that as long as the voltage across capacitor 85 is substantially non-zero, or large enough to forward bias the base-emitter junction of transistor 86, 86 will be turned on, thus providing an effective shunt across the path containing resistor 81 and diode 87, so that no bias current is normally fed to transistor 25 from subcircuit B''. Thus, for non-zero voltage conditions, subcircuit A operates the same as in the embodiment of FIG. 1. As long as the monitored voltage is sufficient to charge capacitor 85 so that transistor 86 is held on, the timing and lockout circuit operates in the same fashion as that of subcircuit B.

However, if the monitored voltage at terminals $V_1 - V_2$ goes to zero, or substantially to zero, the voltage developed across capacitor 85 is insufficient to maintain transistor 86 in an on state, and it turns off, closing off the path which normally shunts the bias feed circuit through resistor 81 and diode 87 to transistor 25. Under these conditions, battery 82 is in a closed loop with resistor 80, resistor 81, diode 87 and transistor 25, thus providing bias current to maintain transistor 25 in an on condition, such that the timing and lockout circuit is not affected, and timing capacitor 45 does not discharge. Thus, the additional circuit achieves the result of maintaining the timing circuit in an energized, or non-timed out state when the monitored voltage drops to zero, as opposed to the condition where the monitored voltage drops below the sensed threshold level, but remains non-zero.

In summary, subcircuit B'', containing the non-interruptable power supply (battery 82) enables the LVI to function as follows:
a. During a power outage, when the monitored voltage drops to zero (or substantially zero) the information stored in the lockout subcircuit is unaltered, such that a low voltage condition is not detected as such;
b. There is no need to reset the LVI following the restoration of monitored voltage after a power outage; and
c. Maintenance free operation of the device is provided as a result of the charging path which maintains a full charge on battery 82.

I claim:
1. In association with an electric distribution system, apparatus for monitoring and registering for subsequent interrogation an occurrence at monitoring terminals, sustained for at least a predetermined time period, of a system voltage less than a predetermined voltage, comprising:
   a. threshold voltage sensing means adapted to be connected to said monitoring terminals and having an output switchably responsive to said system voltage dropping below said threshold voltage;
   b. timing and lockout means connected to said threshold voltage sensing means and having a two-state switchable output for timing said predetermined time period and locking into and maintaining one of the two states when said system voltage is sustained below said threshold voltage for a period in excess of said predetermined time period, and having first and second switches, the output of each of said switches being connected to the input of the other switch so that when one of said switches is closed the other of said switches is open; and
   c. readout means coupled to said two-state switchable output for reading out the state of said timing and lockout means to determine whether said system voltage had been continuously below said predetermined voltage for a period in excess of said predetermined time period.
2. The apparatus as described in claim 1, wherein said threshold sensing means comprises:
   a. a voltage divider;
   b. a zener diode connected to the output of said voltage divider;
   c. a rectifier connected in series with said zener diode to rectify current through said zener diode; and
   d. threshold switching means connected to and driven by said rectifier, for providing a switchable two-state high-low conductance path between said threshold voltage sensing means output and one of said monitoring terminals.
3. The apparatus as described in claim 2 wherein said voltage divider contains a temperature responsive element for compensating for variations in the operating characteristics of said zener diode with respect to temperature.
4. The apparatus as described in claim 2, wherein said threshold switching means comprises a Darlington transistor having its base resistively connected to said rectifier, its emitter connected to said one of said monitoring terminals, and its collector being the threshold voltage sensing means output.
5. The apparatus as described in claim 1, wherein said timing and lockout means comprises:
   a. voltage divider means for dividing said monitored system voltage, connected to said monitoring terminals;
   b. rectifier supply means connected to the output of said voltage divider means for providing a rectified voltage;
   c. timing means actuated from the output of said threshold voltage sensing means for timing out when said system voltage has continuously remained below said threshold voltage for at least said predetermined period, said timing means being connected to said rectifier supply means; and,
   d. said timing means including timing switch means for actuating said two-state switchable output.
6. The apparatus described in claim 5, wherein after said timing means begins to time out following an occurrence of a drop in said system voltage below said threshold voltage but before timing out, said system voltage rises above said threshold voltage, said timing means is restored to its condition previous to beginning of timing out, in preparation for again beginning to time out on a subsequent occurrence of said system voltage dropping below said threshold voltage.
7. The apparatus as described in claim 5, comprising arming means for arming said timing means for subsequent threshold sensing.
8. The apparatus as described in claim 5, wherein said timing means comprises a timing capacitor in series with a resistor, said timing capacitor and resistor being in series with a timing switch which provides a discharge path for said timing capacitor.
9. The apparatus as described in claim 8 wherein said resistor and said timing capacitor have a time constant such that, when said timing capacitor discharges through said timing switch, the current supplied to said timing switch from said timing capacitor falls to a level at which said timing switch is turned off in said predetermined time period.
10. The apparatus as described in claim 5 wherein said timing switch means comprises a transistor switch with its input connected to said rectifier supply means through a blocking diode and said timing means and said blocking diode cooperate to switch off said transistor switch upon the occurrence of said threshold switching means switching to a low conductance path.
11. The apparatus as described in claim 1, wherein said readout means comprises:
   a. voltage divider means connected to said monitoring terminals for providing a fraction of said monitored voltage;
   b. readout display means, for providing a readout signal indicative of the state of the switchable output of said timing and lockout means;
   c. coupling means for coupling said output of said timing and lockout means to said readout display means; and,
   d. interrogating means, for interrogating said readout display means.
12. The apparatus as described in claim 11, wherein said readout display means comprises a silicon con- trolled rectifier in series with a display element, said coupling means comprises a second voltage divider having an output connected to the gate of said SCR, and said interrogating means comprises a switch in series with said display element.

13. The apparatus as described in claim 11, wherein said interrogating means comprises remotely controlled interrogating switch means.

14. The apparatus as described in claim 1, in combination with a watthour meter driven by and connected to said monitored system voltage, said threshold voltage sensing means, said timing and lockout means, and said readout means being fixed within the housing of said watthour meter.

15. Apparatus as described in claim 1 wherein said timing and lockout means comprises:
   a. a voltage divider;
   b. a rectifier connected to the output of said voltage divider, to provide a normal rectified voltage; and,
   c. timing means connected to said rectifier for timing out when said system voltage has continuously remained below said threshold voltage for at least said predetermined period.

16. Apparatus as described in claim 15 wherein said timing means has a silicon controlled rectifier switch in series with a timing and storage capacitor and a resistor, such capacitor and resistor having a time constant such that said capacitor, when charged to said normal rectified voltage and said threshold switching means is switched to a low conductance state, discharges through said silicon controlled rectifier with the discharge current falling to the level of the holding current of said silicon controlled rectifier in said predetermined time period.

17. Apparatus as described in claim 16 comprising arming means for arming said timing means for subsequent threshold sensing.

18. The apparatus as described in claim 15 wherein said arming means switchably connects said rectifier to the gate of said silicon controlled rectifier to trigger said silicon controlled rectifier.

19. The apparatus as described in claim 1 comprising zero voltage detection means connected between said sensing means and said timing and lockout means, for maintaining said sensing means unresponsive to a zero system voltage, such that said timing and lockout means is prevented from locking into said one of two states when said system voltage is zero.

20. The apparatus as described in claim 19, wherein said timing and lockout means comprises a non-interruptable power source, coupling means coupling said non-interruptable source to said sensing means, and voltage-sensitive shunt means in shunt connection with said coupling means, said shunt means being adapted to prevent said sensing means from being switchably responsive to a monitored zero system voltage.

21. In association with an electric distribution system, apparatus for monitoring and registering for subsequent interrogation an occurrence at monitoring terminals, sustained for at least a predetermined time period, of a non-zero system voltage less than a predetermined threshold voltage, comprising:
   a. threshold voltage sensing means adapted to be connected to said monitoring terminals and having an output switchably responsive to said non-zero system voltage dropping below said threshold voltage;
   b. timing and lockout means connected to said sensing means and having a two-state switchable output for timing said predetermined time period and locking into and maintaining one of the two states when said non-zero system voltage is sustained below said threshold voltage for a period in excess of said predetermined time period;
   c. zero voltage detection means connected between said sensing means and said timing and lockout means, for maintaining said sensing means output unresponsive to a zero system voltage but permitting said sensing means to be responsive to a non-zero voltage less than said threshold voltage; and
   d. readout means coupled to said two-state switchable output for reading out the state of said timing and lockout means to determine whether said system voltage had been continuously below said predetermined voltage for a period in excess of said predetermined time period.

22. The apparatus as described in claim 21 wherein said zero voltage detection comprises a non-interruptable power source, coupling means coupling said non-interruptable source to said sensing means, and voltage-sensitive shunt means in shunt connection with said coupling means, said shunt means being adapted to prevent said sensing means from being switchably responsive to a monitored zero system voltage.

* * * * *